117043 FIG. 1.
JOHN T BURRS IMPROVED HYDROSTATIC ACCUMULATOR
Patented JUL 18 1871
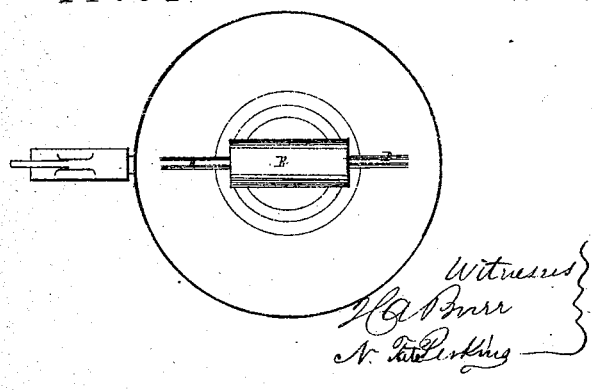
Witnesses
H A Burr
N. Tate Perkins
Inventor
John T Burr
FIG 2
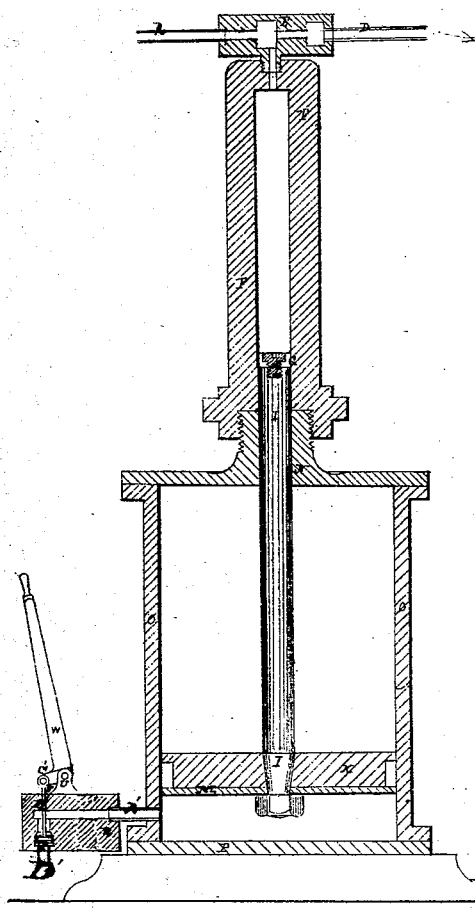
FIG 3
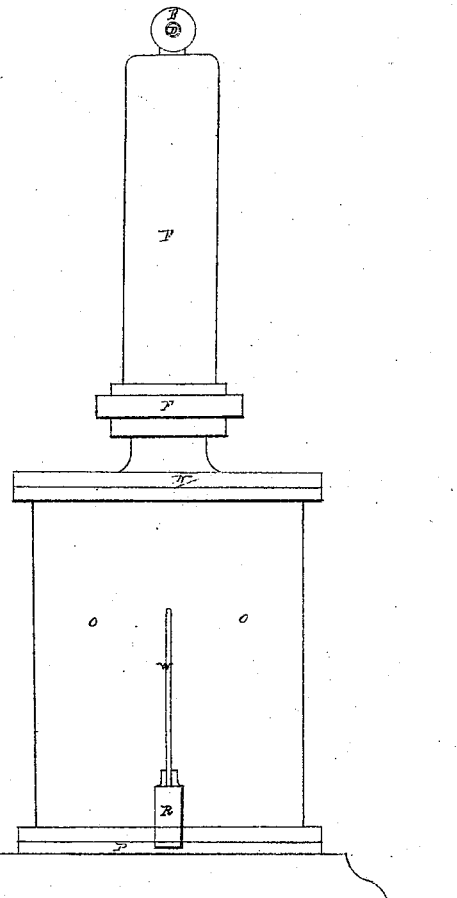

UNITED STATES PATENT OFFICE.

JOHN T. BURR, OF BROOKLYN, NEW YORK.

IMPROVEMENT IN HYDROSTATIC PRESSES.

Specification forming part of Letters Patent No. 117,043, dated July 18, 1871.

*To all whom it may concern:*

Be it known that I, JOHN T. BURR, of Brooklyn, county of Kings, State of New York, have invented certain Improvements in Hydrostatic Machinery, of which the following is a specification:

The object of my invention is to provide a constant supply of power, under high pressures, to be used as often and with as much expedition as may be necessary. This will so change the nature of the normal hydrostatic or Brahma press as to overcome its worst feature, viz.: great want of rapidity of motion. I am aware that this has been accomplished by the use of the so-called weighted accumulator, but this is so expensive as to entirely preclude its use save by corporations, governments, or establishments possessed of very large capital.

To enable those skilled in the art to make and use my invention, I will proceed to describe its construction and operation in the accompanying drawing.

Figure 1 is a plan. Fig. 2 is a vertical section. Fig. 3 is a side elevation.

Like letters refer to like parts in each view.

O is a steam-cylinder; I, a piston-rod; K, a piston-head; and M, the follower. P is the bottom cover of the cylinder, and N the top cover. To the cylinder O a valve-chest, R, is attached by means of the pipe A'. This chest contains a stop-valve, T, of any convenient construction, through which steam is admitted. This valve is connected, by the stem S', to the bell-crank C', and to the crank is fastened the lever W, by which the valve may be opened and closed. This valve is opened in the morning, or when pressing is about to commence, and not closed until the day's work is done. F is a hydrostatic cylinder, securely fastened to the top cover N of the steam-cylinder O. The piston-rod I serves the purpose of a ram for the cylinder F, and is provided with a hydrostatic packing, G, held firmly in place by packing-follower H, which is screwed into ram or piston I. Into the upper end of the hydrostatic cylinder F is fastened a T-connection, E, with one outlet into the hydrostatic cylinder E. Into the two other outlets of this T-connection are firmly fastened the pipes A and D. The pipe A connects the T-connection E with a suitable hydrostatic pump or pumps. The pipe D connects the T-connection E with the press, presses, or other machinery to be operated. D' is a steam pipe, of suitable size, connecting the stop-valve R with the boiler. Upon the relative diameters of the steam-cylinder O and hydrostatic cylinder F depends the pressure of the fluid medium to be used in operating. For example, if steam of 100 pounds pressure per inch is admitted into the steam cylinder, the area of whose piston is 1,000 square inches, a total pressure of 100,000 pounds is obtained on the upper end of the piston-rod or ram I. Now, if the area of the piston-rod or ram I is 10 square inches the pressure on the fluid medium will be 10,000 pounds to each square inch of area. So, with steam at this pressure, to obtain a pressure of 10,000 pounds to the square inch in the hydrostatic machinery to be operated the ratio of 1 to 100 is necessary. One other element of the design of my accumulator remains, and that is the capacity for moving the requisite amount of fluid medium. Let it be required to move six presses each 10 inches in diameter and 10 inches stroke (the ordinary complement of a mill for crushing linseed-oil) in one full stroke of the accumulator. The area of a 10-inch diameter ram is 78.54 inches. This multiplied by the stroke in inches gives us 785.41 cubic inches for each, or for the whole six 4712.40 cubic inches. This would require the hydrostatic cylinder at the accumulator to be of area 65.40 square inches (or 9 inches in diameter) and 72 inches stroke. To obtain a pressure of 5,000 pounds to the square inch on the fluid medium in any hydrostatic cylinder of this size would require, with steam at 100 pounds per square inch, 3,570 square inches of area in piston-head, or 64.5 inches diameter and 72 inches stroke.

The operation of my accumulator is as follows: When the operation of pressing is about to commence the stop-valve T is opened, admitting steam into the cylinder O, which forces up the ram or piston I. The hydrostatic pumps are now started and they force the fluid medium through the pipe A into the hydrostatic cylinder F, forcing down the ram I. The fluid medium (when sufficient has accumulated in the hydrostatic cylinder F) is now drawn off through the pipe D to the press, presses, or other machinery to be operated. This draught of the fluid medium is replaced as fast as possible by the hydrostatic pumps. No steam is consumed in the operation proper of the accumulator except what is lost by condensation, as there is no exhaust into the atmosphere.

In designing this apparatus the hydrostatic pumps are made of sufficient size to replace the fluid medium in the hydrostatic cylinder F, during the interval between pressing, as fast it may be required. I do not limit myself to the use of steam in the cylinder O as any expansive medium may replace it.

I claim as my invention—

A hydrostatic accumulator, having the enlarged cylinder O, piston K, ram I, and water-cylinder F, constructed to operate substantially as hereinbefore shown and described.

JOHN T. BURR.

Witnesses:
    HENRY A. BURR,
    N. TATE PERKINS.